(12) United States Patent
Yamaguchi

(10) Patent No.: US 11,520,532 B2
(45) Date of Patent: Dec. 6, 2022

(54) INFORMATION PROCESSING APPARATUS, CONTROL METHOD, AND STORAGE MEDIUM STORING PROGRAM

(71) Applicant: CANON KABUSHIKI KAISHA, Tokyo (JP)

(72) Inventor: Yoshinori Yamaguchi, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/928,887

(22) Filed: Jul. 14, 2020

(65) Prior Publication Data

US 2021/0026573 A1 Jan. 28, 2021

(30) Foreign Application Priority Data

Jul. 26, 2019 (JP) .............................. JP2019-138246

(51) Int. Cl.
 *G06F 3/12* (2006.01)

(52) U.S. Cl.
 CPC ............ *G06F 3/1204* (2013.01); *G06F 3/126* (2013.01); *G06F 3/1225* (2013.01); *G06F 3/1286* (2013.01)

(58) Field of Classification Search
 CPC ...... G06F 3/1204; G06F 3/126; G06F 3/1225; G06F 3/1286; G06F 3/1231
 See application file for complete search history.

(56) References Cited

U.S. PATENT DOCUMENTS

| | | | | |
|---|---|---|---|---|
| 2004/0021906 | A1* | 2/2004 | Howard | G06F 3/1209 358/1.16 |
| 2004/0263900 | A1* | 12/2004 | Nguyen | G06F 3/1224 719/321 |
| 2006/0072140 | A1* | 4/2006 | Mitani | G06F 3/1253 358/1.13 |
| 2011/0051185 | A1* | 3/2011 | Takahashi | G06F 3/1253 358/1.15 |
| 2011/0058203 | A1* | 3/2011 | Hwang | H04L 61/2076 358/1.15 |
| 2012/0127498 | A1* | 5/2012 | Lombardo | G06F 3/1226 358/1.15 |
| 2012/0212760 | A1* | 8/2012 | Sakura | G06F 3/1204 358/1.13 |
| 2016/0239904 | A1* | 8/2016 | Washington | G06Q 50/12 |
| 2017/0017444 | A1* | 1/2017 | Hirano | G06F 3/1286 |
| 2017/0279998 | A1* | 9/2017 | Nakagawa | H04N 1/32539 |
| 2021/0096792 | A1* | 4/2021 | Chew | G06F 3/1267 |

FOREIGN PATENT DOCUMENTS

JP 2015-153126 A 8/2015

* cited by examiner

*Primary Examiner* — Helen Zong
(74) *Attorney, Agent, or Firm* — Canon U.S.A., Inc. IP Division

(57) ABSTRACT

An information processing apparatus having a plurality of transmission queues includes a selection unit that selects a target transmission queue from among the plurality of transmission queues, and a change unit that changes port setting information of the selected target transmission queue to port setting information with which communication with a printing device corresponding to the target transmission queue is possible. The change unit changes port setting information of another transmission queue with which the same identification information as identification information of the target transmission queue is associated, to the port setting information with which communication with the printing device is possible.

21 Claims, 17 Drawing Sheets

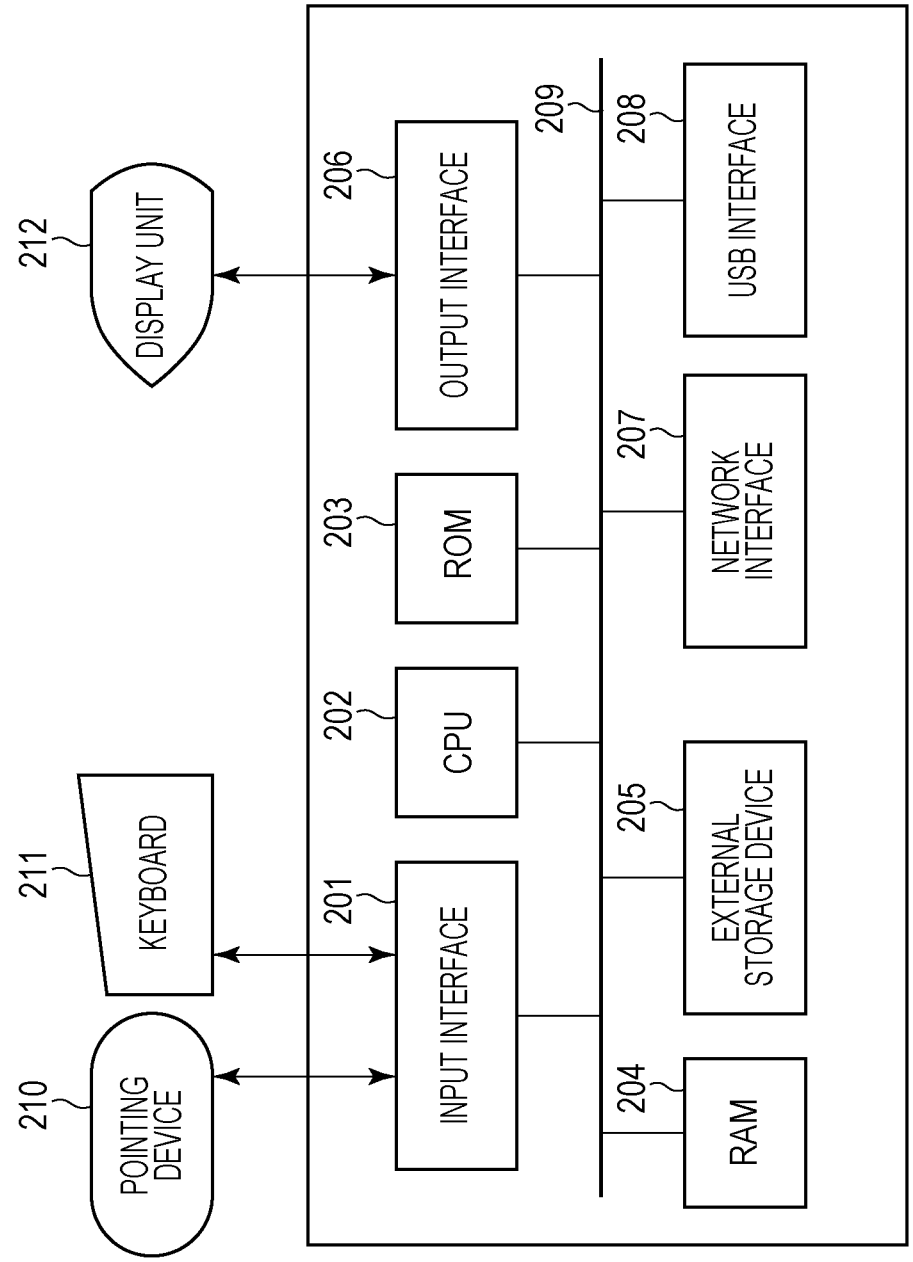

FIG. 11

| TRANSMISSION QUEUE NAME | ACQUIRED ID |
|---|---|
| 8500 series GDI WSD | {···0000-1000-8000-ABCD1234EFGH} |
| 8500 series XPS WSD | {···0000-1000-8000-ABCD1234EFGH} |
| 8500 series FAX WSD | {···0000-1000-8000-ABCD1234EFGH} |
| 8500 series GDI IP | {···AAAA-BBBB-1234-000000000000} |
| 8500 series XPS IP | ID WAS NOT ABLE TO BE ACQUIRED |
| 8500 series FAX IP | {···EEEE-FFFF-0000-222222222222} |
| 70 series GDI WSD | {···0000-1000-8000-1234AAAA5678} |
| 70 series XPS WSD | {···0000-1000-8000-1234AAAA5678} |

1101

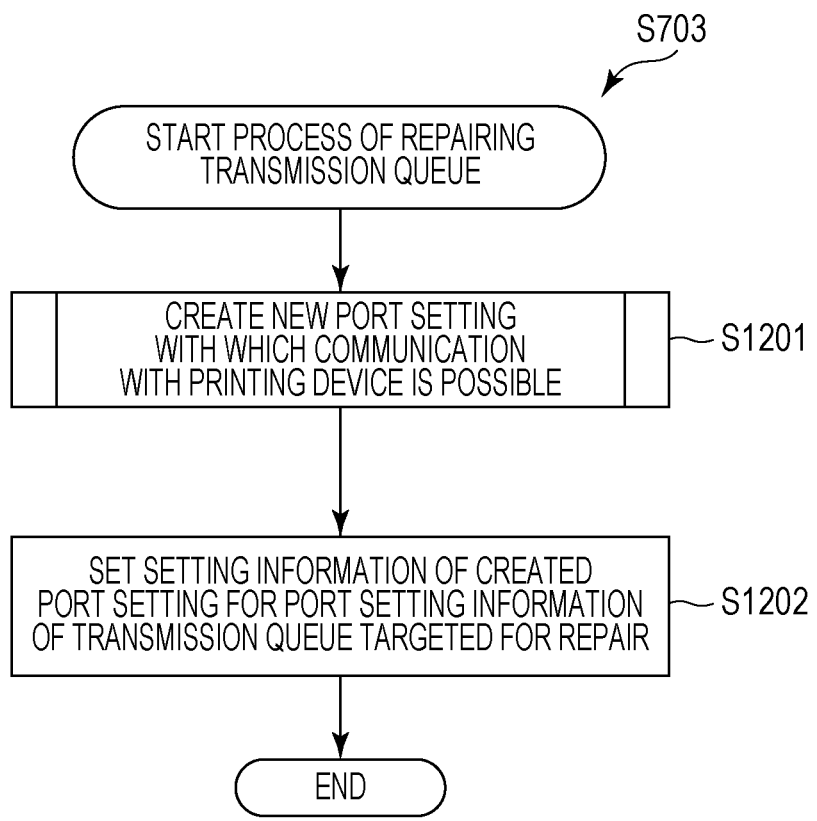

INFORMATION PROCESSING APPARATUS, CONTROL METHOD, AND STORAGE MEDIUM STORING PROGRAM

BACKGROUND

Field

The present disclosure relates to an information processing apparatus, a control method, and a storage medium storing a program.

Description of the Related Art

In an environment in which an information processing apparatus and a printing device are connected to the same network, the information processing apparatus can control the printing device via the network. Incidentally, Japanese Patent Laid-Open No. 2015-153126 discloses a solution implemented when the information processing apparatus and the printing device are not able to communicate with each other via the network.

SUMMARY

Various embodiments of the present disclosure provide a mechanism that provides an improvement for making communication more convenient to use in conditions where communication between an information processing apparatus and a printing device is impossible.

According to one embodiment, an information processing apparatus is provided which has a plurality of transmission queues. The information processing apparatus includes a selection unit configured to select a target transmission queue from among the plurality of transmission queues, and a change unit configured to change port setting information of the selected target transmission queue to port setting information with which communication with a printing device corresponding to the target transmission queue is possible. The change unit changes port setting information of another transmission queue with which same identification information as identification information of the target transmission queue is associated, to the port setting information with which communication with the printing device is possible.

Various embodiments of the present disclosure enable an improvement for making communication more convenient to use.

Further features of the present disclosure will become apparent from the following description of exemplary embodiments with reference to the attached drawings.

BRIEF DESCRIPTION OF THE DRAWINGS

FIG. 2 illustrates a hardware configuration of an information processing apparatus according to one embodiment.

FIG. 11 illustrates an example of an acquired ID list management table according to one embodiment.

FIG. 12 is a flowchart illustrating a flow of the port repair process according to one embodiment.

DESCRIPTION OF THE EMBODIMENTS

Figure 1A:
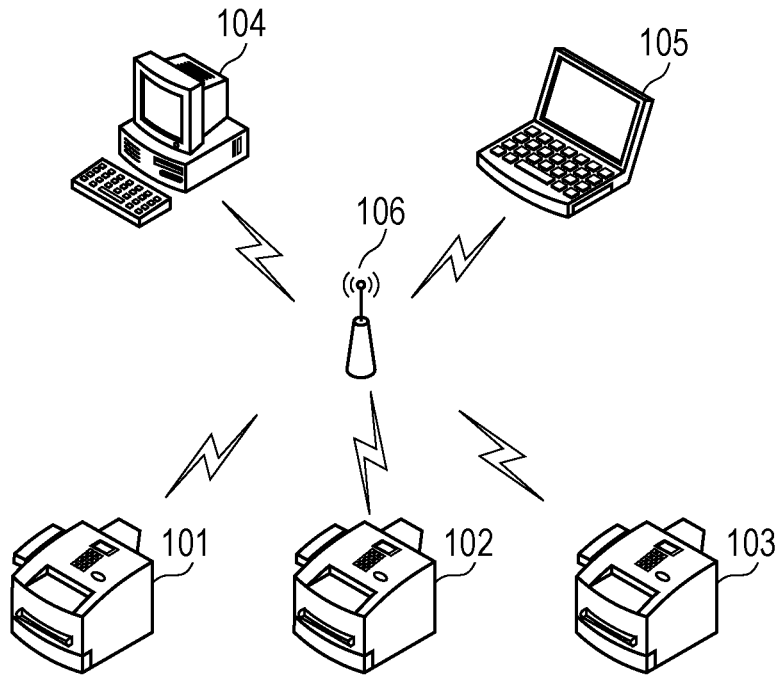
FIGS. 1A and 1B each illustrate an example of an equipment configuration according to one embodiment.

Hereinafter, an embodiment will be described in detail with reference to the attached drawings. Note that the following embodiment is not intended to limit the scope of the claimed invention. Multiple features are described in the embodiment, but all such features are not necessary in all embodiments of the present disclosure. Multiple such features may be combined as appropriate. Furthermore, in the attached drawings, the same reference numerals are given to the same or similar configurations, and redundant description thereof is omitted.

A configuration described in the following embodiment is merely an example, and the present invention is not limited to an illustrated configuration.

First Embodiment

Figure 1B:
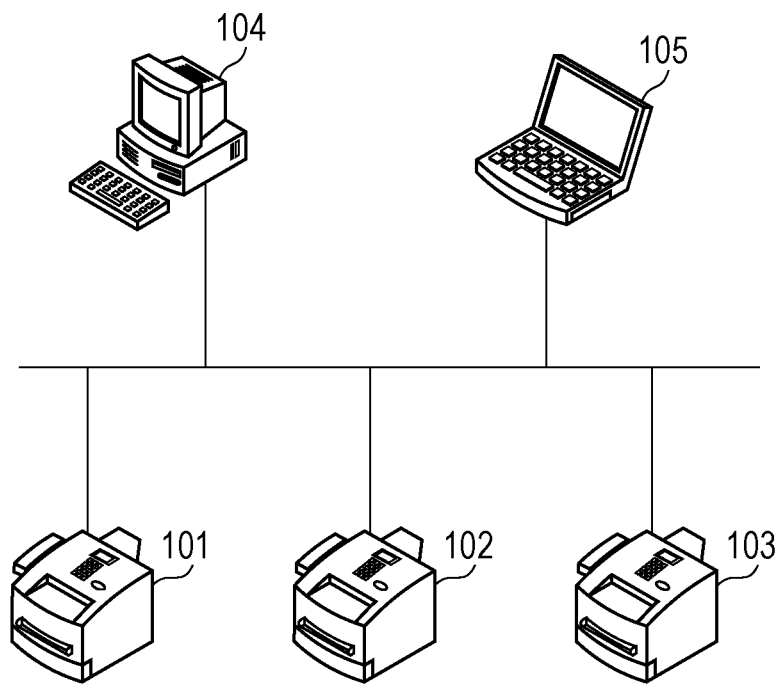

First, an entire configuration of a printing system according to the present embodiment will be described. FIGS. 1A and 1B illustrate entire configurations of respective printing systems that differ from each other in a connection mode between a printing device and an information processing apparatus, which is host equipment of the printing device.

The printing system illustrated in FIG. 1A is constituted by three printing devices 101 to 103 having a wireless local area network (LAN) communication function, and two information processing apparatuses 104 and 105 that can communicate with the three printing devices via a wireless LAN. In FIG. 1A, the printing devices 101 to 103 and the information processing apparatuses 104 and 105 are connected to the wireless LAN via an access point 106, and each information processing apparatus can control the printing devices 101 to 103 via the wireless LAN.

In the printing system illustrated in FIG. 1B, the three printing devices 101 to 103 and the two information processing apparatuses 104 and 105 are connected via a wired LAN cable 107.

FIG. 2 illustrates an example of a hardware configuration of the information processing apparatus 104 or 105.

Each information processing apparatus is constituted by an input interface 201, a central processing unit (CPU) 202, a read only memory (ROM) 203, a random access memory (RAM) 204, an external storage device 205, such as a hard disk drive (HDD), an output interface 206, a network interface 207, and a Universal Serial Bus (USB) interface 208. These components are connected to one another via a system bus 209.

The input interface 201 is an interface that controls connections to input devices, for example, a pointing device 210, such as a mouse, and a keyboard 211. The output interface 206 is an interface that controls a connection to a display unit 212, such as a liquid crystal display. The network interface 207 is an interface that controls a connection to the wireless LAN via the access point 106 or a connection to a wired LAN via the wired LAN cable 107. The USB interface 208 is an interface that controls a USB connection via a USB cable.

In the ROM 203, an initialization program is stored. In the external storage device 205, an application program group, an operating system (OS), a printer driver, and other various pieces of data are stored. The RAM 204 is used as a working memory used when the CPU 202 executes various programs. The above-described hardware configuration is merely an example, and the hardware configuration of the information processing apparatus is not limited to the above-described example.

Figure 3:
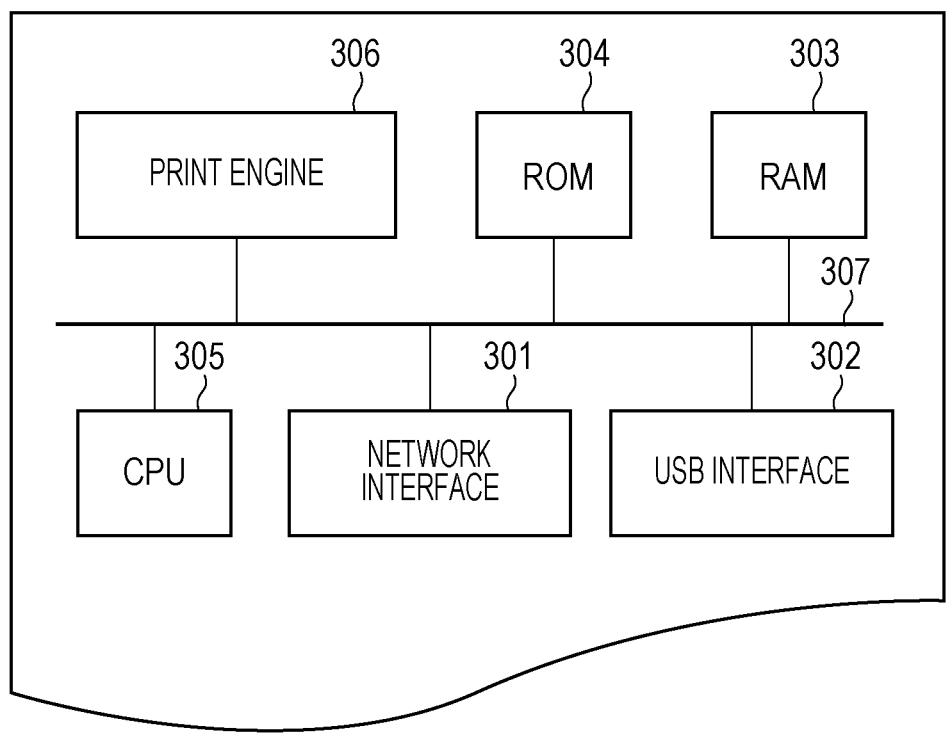
FIG. 3 illustrates a hardware configuration of a printing device according to one embodiment.

FIG. 3 illustrates an example of a hardware configuration of each of the printing devices 101 to 103.

Each printing device is constituted by a network interface 301, a USB interface 302, a RAM 303, a ROM 304, a CPU 305, and a print engine 306. These components are connected to one another via a system bus 307.

The network interface 301 is an interface that controls a connection to the wireless LAN via the access point 106 or a connection to the wired LAN via the wired LAN cable 107. The USB interface 302 is an interface that controls a USB connection via a USB cable.

The RAM 303 is used as a main memory and a working memory of the CPU 305 and functions as a receive buffer for temporarily storing received print data or as a storage area for storing various pieces of data. The print engine 306 performs printing in accordance with print data stored in the RAM 303. Incidentally, the print engine 306 may perform a printing process by using an ink-jet method or may perform a printing process by an electrophotographic method. In the ROM 304, various control programs and data used by each control program are stored, and the CPU 305 controls the components of the printing device in accordance with these control programs. The above-described hardware configuration is merely an example, and the hardware configuration of the printing device is not limited to the above-described example.

Figure 4:
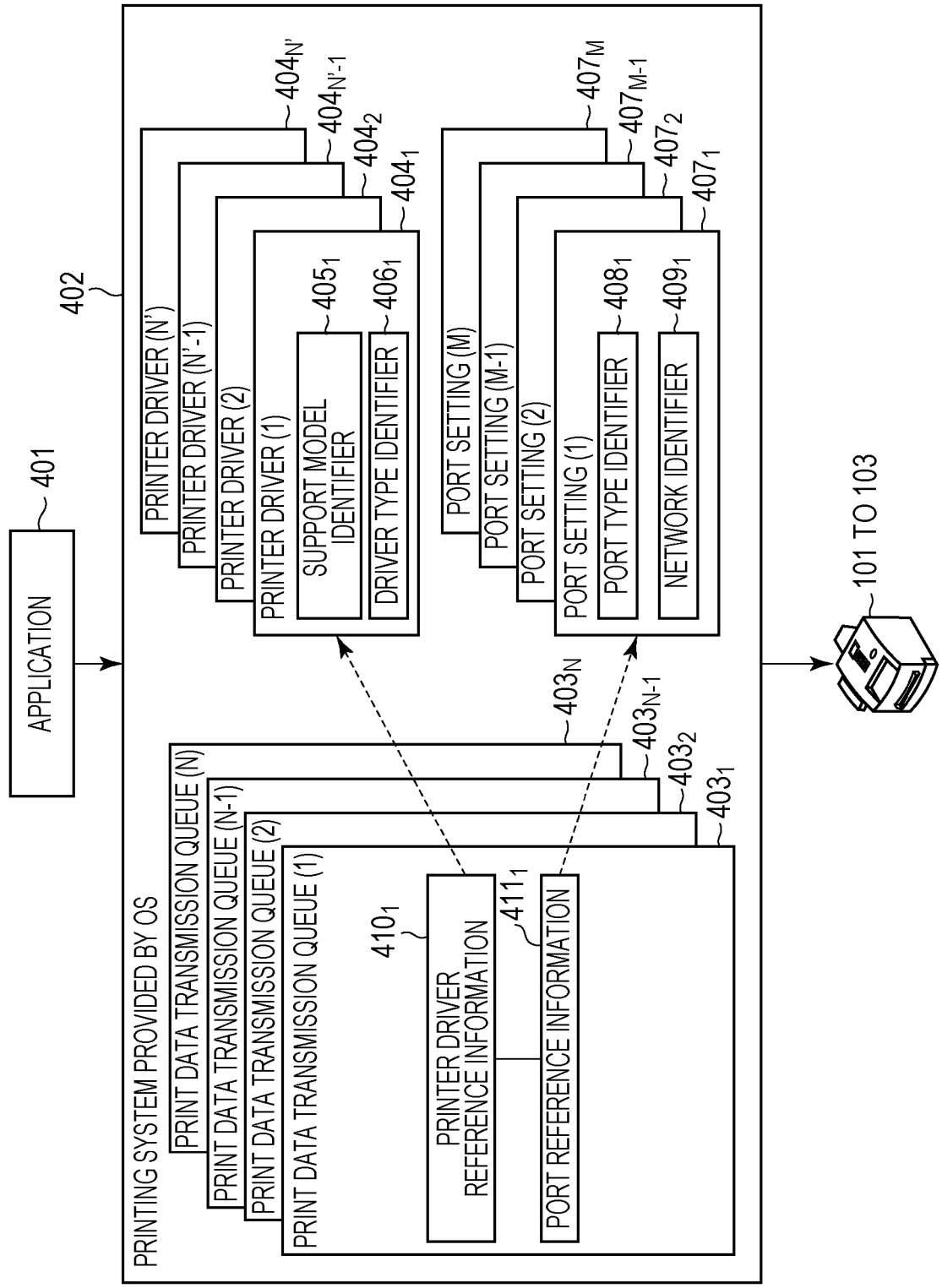
FIG. 4 illustrates a software configuration of the information processing apparatus according to one embodiment.

FIG. 4 illustrates a software configuration of each of the information processing apparatuses 104 and 105 in the present embodiment. An application 401 is software for repairing port setting information of a data transmission queue via which transmission of print data to a printing device selected by a user is impossible due to the defectiveness of destination port setting information. The application 401 inquires, via a printing system 402 provided by the OS, about a print data transmission queue 403 that is available and accesses an appropriate print data transmission queue $403_n$ (where n is any of 1 to N) in accordance with a result of the inquiry. In the present embodiment, the application 401 runs in the information processing apparatus 104. Furthermore, in the present embodiment, the print data transmission queue 403 is also referred to as a transmission queue, and port setting information is also referred to as a port setting.

The application 401 inquires, via the printing system 402, about a printer driver that is available and accesses an appropriate printer driver $404_{n'}$ (where n' is any of 1 to N') in accordance with a result of the inquiry. The printer driver $404_{n'}$ includes, as identifiers, a support model identifier $405_{n'}$, including a version name or model name of a printing device, and a driver type identifier $406_{n'}$, such as graphical device interface (GDI), XML paper specification (XPS), or FAX.

The application 401 inquires, via the printing system 402, about a port setting 407 that is available and accesses an appropriate port setting $407_m$ (where m is any of 1 to M) in accordance with a result of the inquiry. The port setting $407_m$ includes a port type identifier $408_m$, such as USB, transmission control protocol/Internet protocol (TCP/IP), or web services for devices (WSD), and further includes a network identifier $409_m$, such as an IP address or host name.

Each transmission queue $403_n$ (where n is any of 1 to N) is associated with a printer driver and a port setting. The transmission queue $403_n$ includes printer driver reference information 410 and port reference information 411 for identifying an associated printer driver and an associated port.

In FIG. 4, for example, a printer driver reference information $410_1$ is associated with a printer driver $404_1$, and a port reference information $411_1$ is associated with a port setting $407_1$. Incidentally, pieces of printer driver reference information $410_1$ to $410_N$ are respectively associated with printer drivers $404_1$ to $404_{N'}$, and pieces of port reference information $411_1$ to $411_N$ are respectively associated with port settings $407_1$ to $407_m$. The application 401 can acquire the support model identifier $405_{n'}$ that is setting information of the printer driver $404_{n'}$ identified by printer driver reference information $410_n$ included in a transmission queue. Furthermore, the application 401 can acquire the driver type identifier $406_{n'}$ that is setting information of the printer driver $404_{n'}$ identified by the printer driver reference information $410_n$ included in the transmission queue. The application 401 can acquire the port type identifier $408_m$ that is setting information of the port setting $407_m$ identified by port reference information $411_n$ included in the transmission queue. Furthermore, the application 401 can acquire the network identifier $409_m$ that is setting information of the port setting $407_m$ identified by the port reference information $411_n$ included in the transmission queue.

Figure 5:
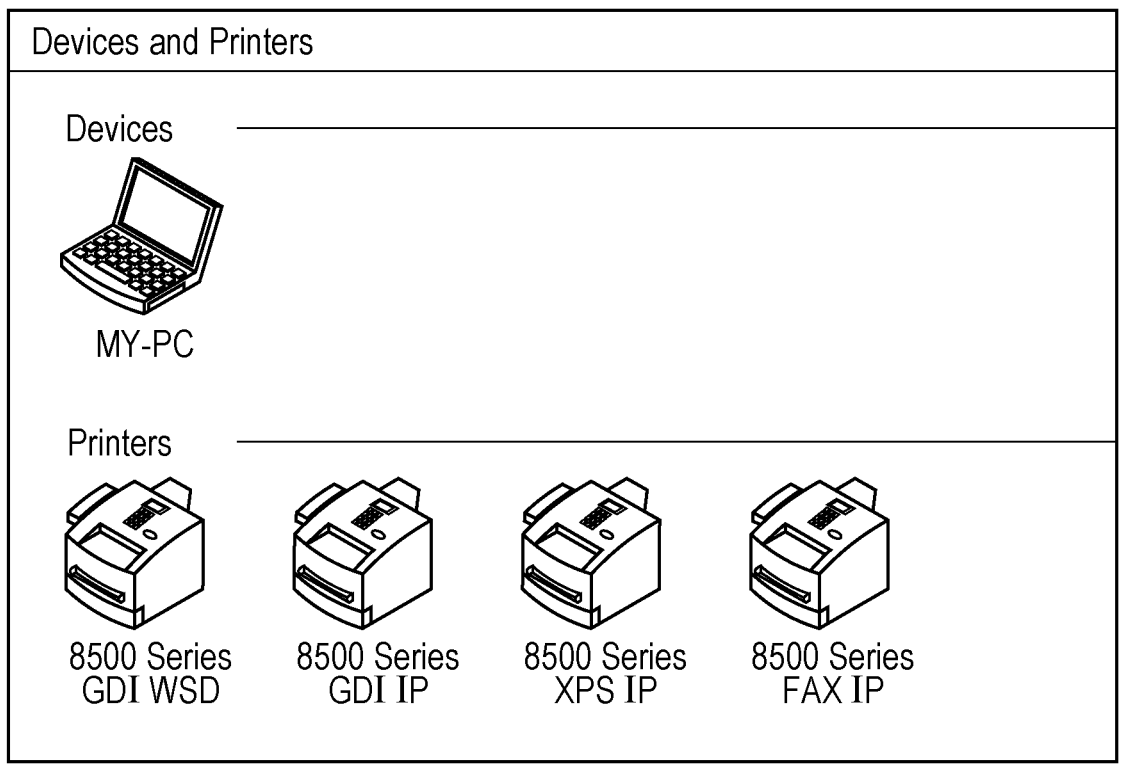
FIG. 5 illustrates an example of a UI screen of an OS according to one embodiment.

FIG. 5 illustrates a user interface (UI) screen for viewing a list of print data transmission queues 403 in a Windows OS. The operating system (OS) displays a list of transmission queues 403 on a screen titled "Printers".

Figure 6A:
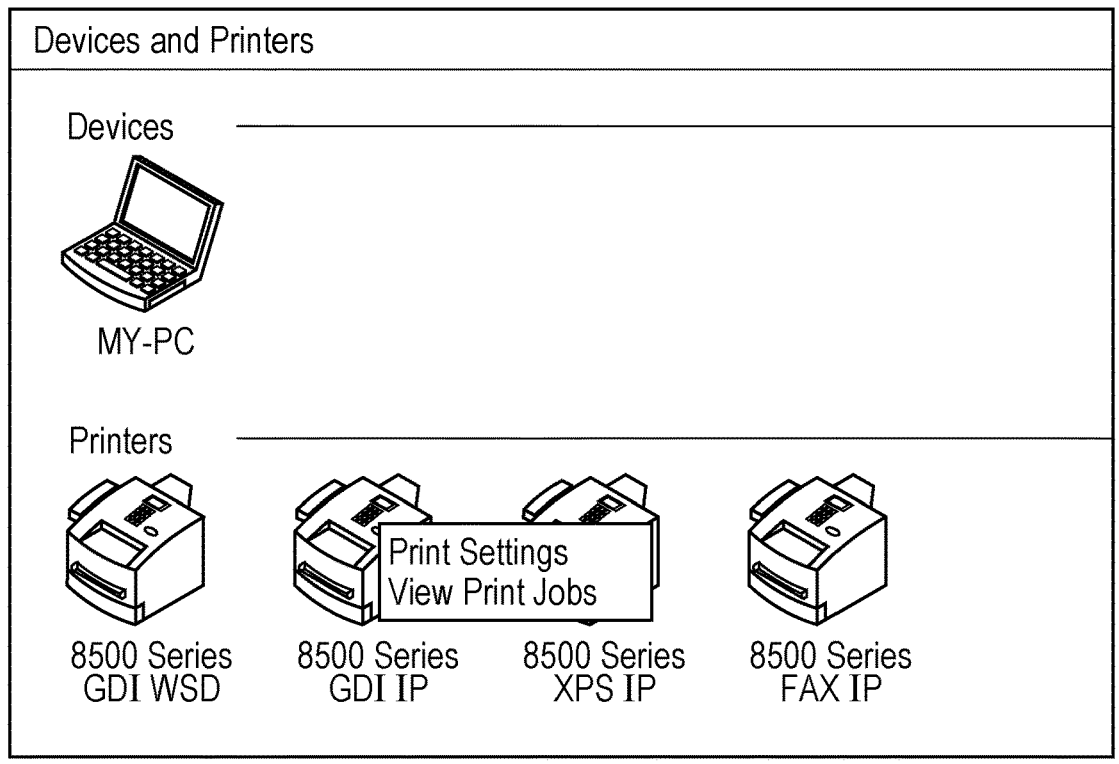
FIGS. 6A and 6B each illustrate an example of a UI screen of the OS according to one embodiment.
Figure 6B:
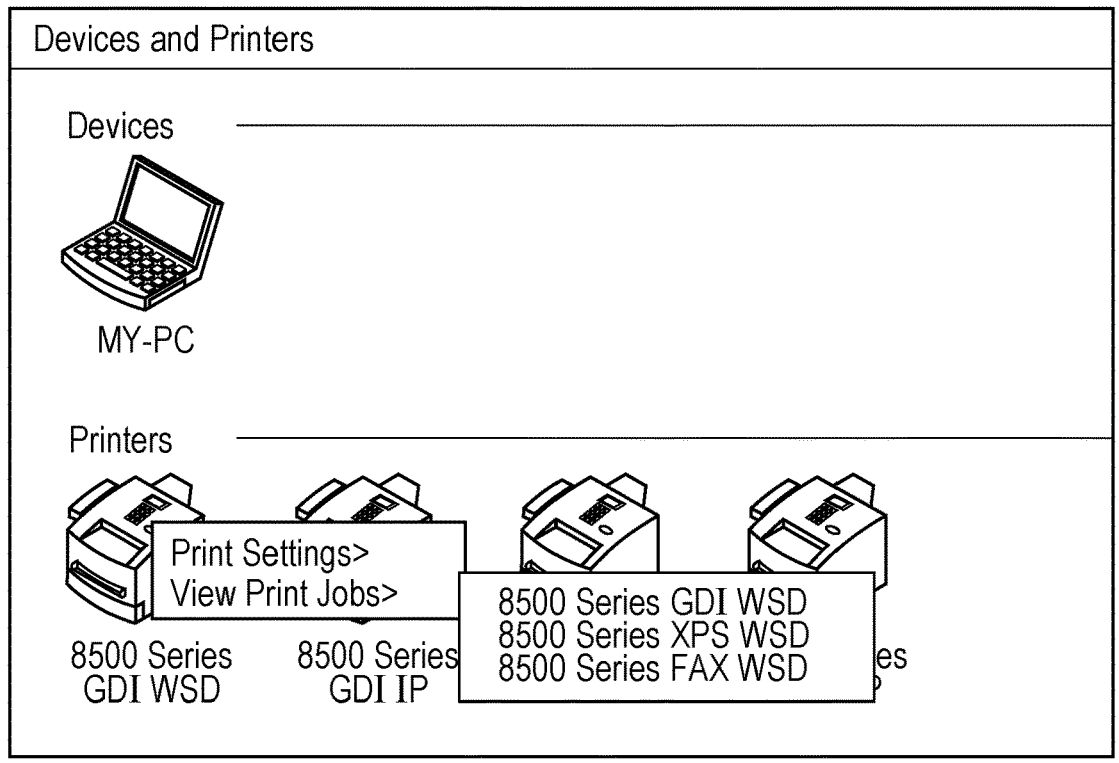

FIG. 6A illustrates a screen provided when the user right-clicks on a transmission queue 403 of "8500 Series GDI IP" in the list being displayed in FIG. 5. In "View Print Jobs" in a menu displayed at this time, there is no submenu. Here, when the user selects "View Print Jobs", a list of print jobs managed in the selected transmission queue of "8500 Series GDI IP" is displayed. FIG. 6B illustrates a screen provided when the user right-clicks on a transmission queue 403 of "8500 Series GDI WSD" in the list being displayed in FIG. 5. In "View Print Jobs" in a menu displayed at this time, there is a submenu. When the user selects "View Print Jobs", the OS prompts the user to select any of "8500 Series GDI WSD", "8500 Series XPS WSD", and "8500 Series FAX WSD". As a result of a selection made by the user, the OS displays a print job of any transmission queue of three transmission queues 403. This is because the OS determines that the three transmission queues are related transmission queues, and thus a display like that illustrated in FIG. 6B is provided.

A flow of a port repair process in the present embodiment will be described with reference to a flowchart of FIG. 7. The port repair process is a process for recovery from a state in which communication from a transmission queue 403 to a printing device is impossible to a state in which the communication is possible. The flowchart in the present embodiment is implemented by the CPU 202 reading a program involved in the flowchart from the ROM 203 or RAM 204 and executing the program. The process of FIG. 7 is implemented by the CPU 202 executing the application 401.

First, the application 401 determines a print data transmission queue 403 targeted for repair in S701. Details of S701 will be described later with reference to a flowchart of FIG. 8. When the transmission queue 403 targeted for repair is determined in S701, the application 401 acquires an ID of the transmission queue 403 in S702. The ID is an ID assigned by the OS when the transmission queue 403 is created. In the Windows OS, the ID is a Container ID. Details of S702 will be described later with reference to a flowchart of FIG. 10. After the ID of the transmission queue 403 is acquired in S702, the application 401 repairs the transmission queue 403 in S703. Details of S703 will be described later with reference to a flowchart of FIG. 12. When S703 ends, the application 401 determines in S704 whether an ID that is the same as the ID of the transmission queue 403 targeted for repair determined in S701 is included among IDs of other transmission queues 403 acquired in S702. When it is determined that there is another transmission queue 403 with the same ID, the application 401 returns to S703 and repairs the transmission queue 403. When there is no transmission queue 403 with the same ID, the application 401 ends the process. In the above-described process, even when the order of executing S701 and S702 is reversed, a similar result can be obtained.

Figure 7:
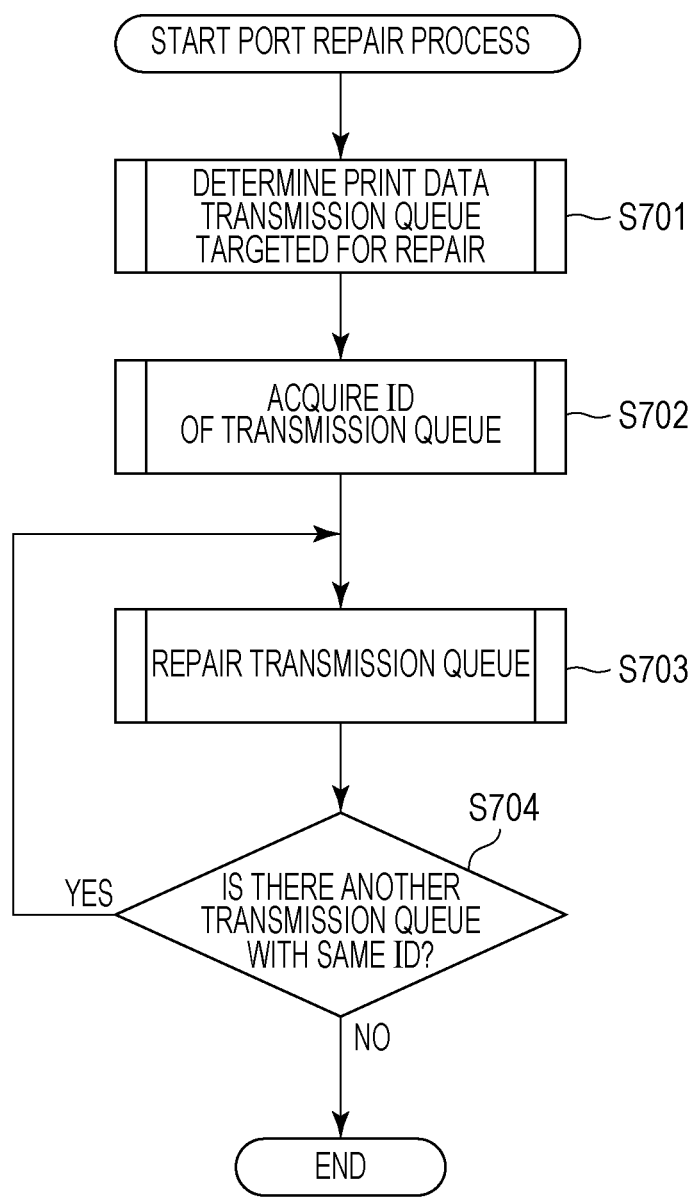
FIG. 7 is a flowchart illustrating a flow of a port repair process according to one embodiment.
Figure 8:
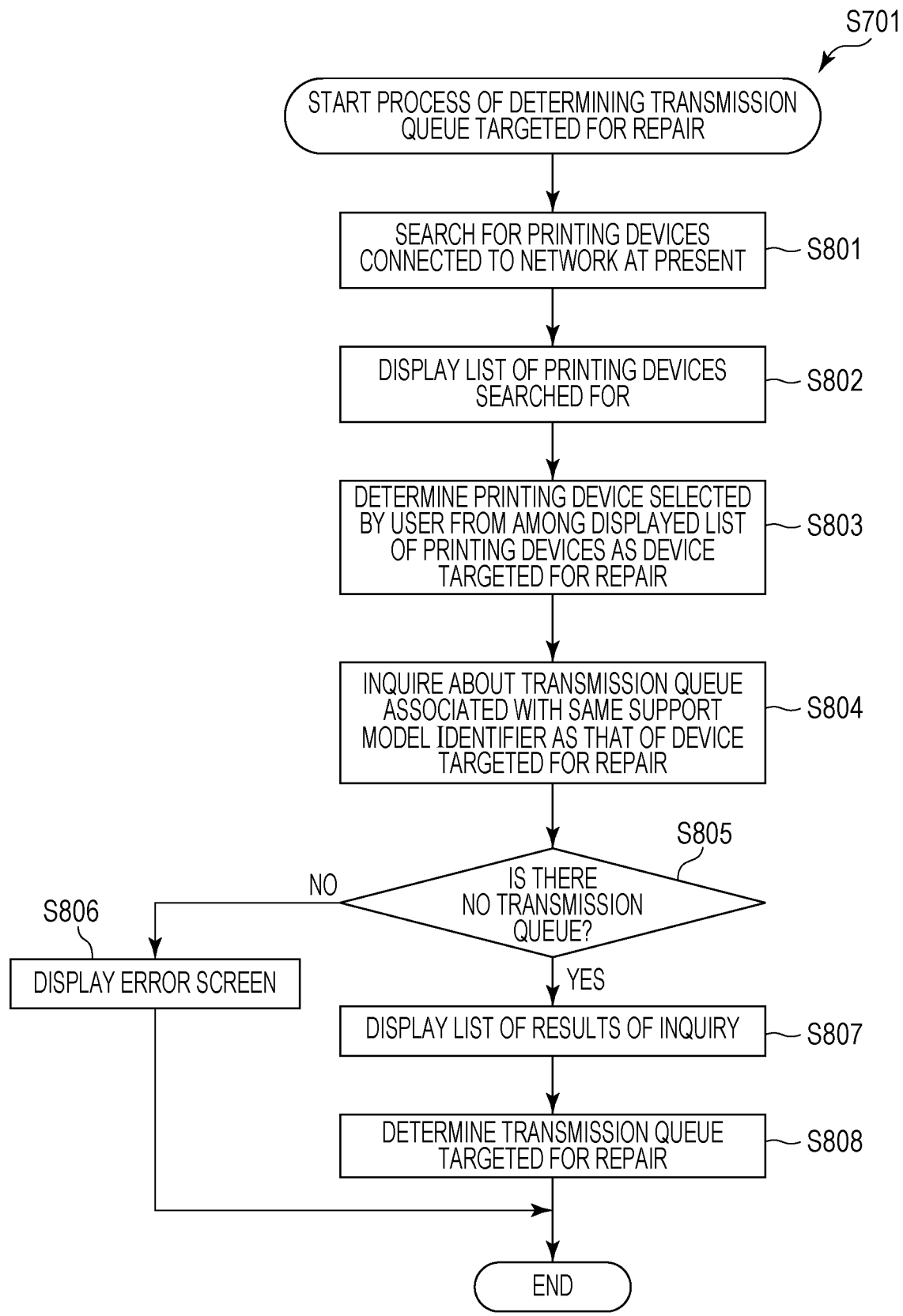
FIG. 8 is a flowchart concerning a process of determining a transmission queue targeted for repair according to one embodiment.

FIG. 8 is a flowchart for illustrating details of S701 in FIG. 7.

First, in S801, the application 401 searches for printing devices (101 to 103) connected to a network to which the information processing apparatus 104 that the application 401 runs in is connected. In an example of a search method, the application 401 instructs the network to transmit a search command in a broadcast manner, and S801 is implemented in accordance with a response to the search command.

Figure 9A:
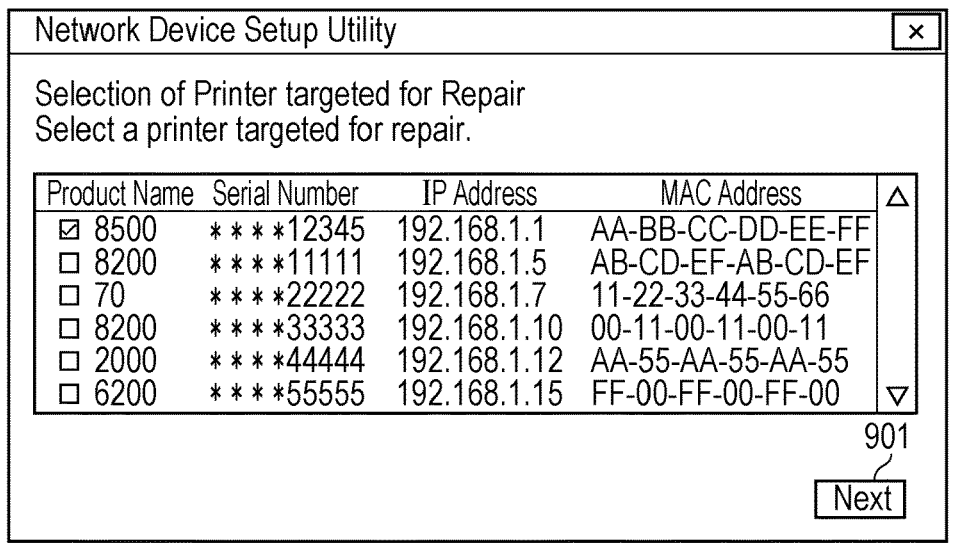
FIGS. 9A to 9C each illustrate an example of a UI screen of an application according to one embodiment.

Subsequently, in S802, the application 401 displays a list of printing devices that have sent back a response. FIG. 9A illustrates an example of a UI screen displayed in S802. The response to the search command in S801 includes a name of a printing device and network information of the printing device. Furthermore, the network information includes information, for example, indicating that WSD has been enabled or disabled, that link-local multicast name resolution (LLMNR) has been enabled or disabled, and that domain name system (DNS) has been enabled or disabled.

Subsequently, in S803, the application 401 receives a selection of a printing device targeted for repair via the screen illustrated in FIG. 9A. In FIG. 9A, to select a printing device that the user wants to repair, that is, to select a printing device that the user wants to recover communication with, the user checks a left checkbox in the list and then clicks a [Next] button 901. When a press of the [Next] button 901 is detected, the application 401 executes next S804. In the present embodiment, assume that the printing device 101 is selected.

In S804, the application 401 inquires of the printing system 402 provided by the OS about a transmission queue 403 associated with the same identification information (for example, a model name) as identification information (for example, a model name) of the printing device targeted for repair. Specifically, the application 401 inquires about a transmission queue that refers to a printer driver including a support model identifier 405 in which the same identification information (for example, a model name) is set.

When the inquiry is completed, the application 401 executes next S805. In S805, as a result of the inquiry, when it is determined that there is no transmission queue, the application 401 executes S806. When it is determined that there are one or more transmission queues, the application 401 executes S807.

Figure 9B:
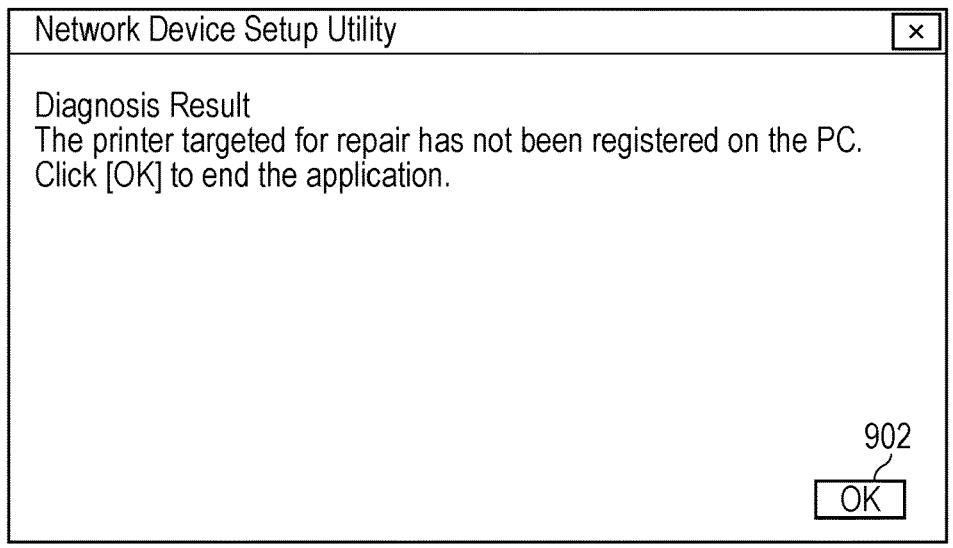

In S806, the application 401 displays an error screen illustrated in FIG. 9B. The user presses an [OK] button 902. When a press of the [OK] button 902 is detected, the application 401 closes the program, and the port repair process ends. The case where a determination of NO is made in S805 occurs when a transmission queue corresponding to the printing device selected in S802 has not yet been registered on the information processing apparatus.

Figure 9C:
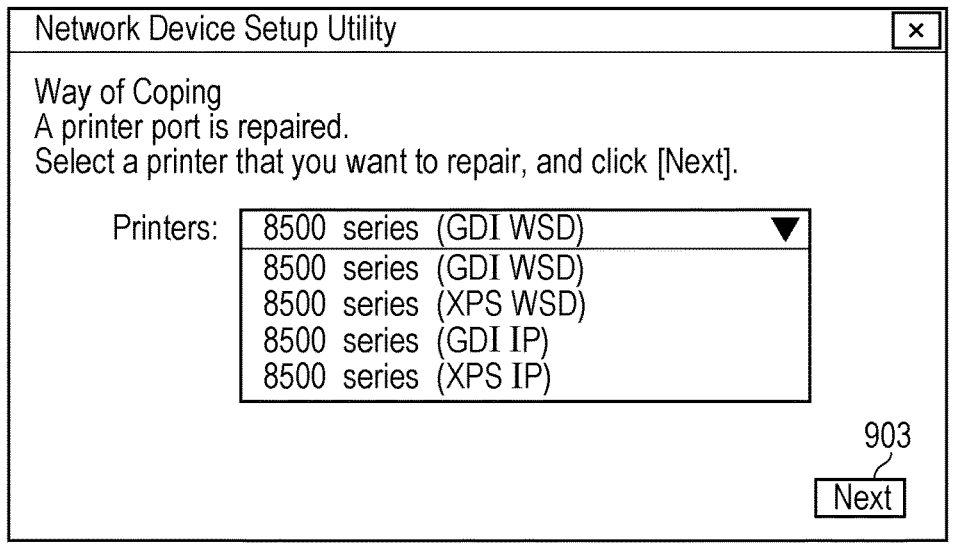

In S807, the application 401 displays a list of print data transmission queues acquired as results obtained by inquiring of the OS. FIG. 9C illustrates an example of a UI screen of a list displayed by the application 401. In the present embodiment, although the application 401 displays, as a result list, only transmission queues having GDI and XPS in respective driver type identifiers, a display provided by the application 401 is not limited to this. For example, a transmission queue in which FAX is set in a driver type identifier may also be displayed, or a transmission queue in which other identification information is further set may also be displayed.

Subsequently, in S808, the application 401 selects a transmission queue targeted for repair. The process of S808 is executed in accordance with a selection operation performed by the user via the screen illustrated in FIG. 9C. In FIG. 9C, the application 401 displays a drop-down list of transmission queues 403 that can be selected. In this screen, the user clicks a [Next] button 903 in the screen with a transmission queue 403 that the user wants to repair being selected from the drop-down list. When a press of the [Next] button 903 is detected, the application 401 executes S808 and specifies the transmission queue 403 targeted for repair.

Figure 10:
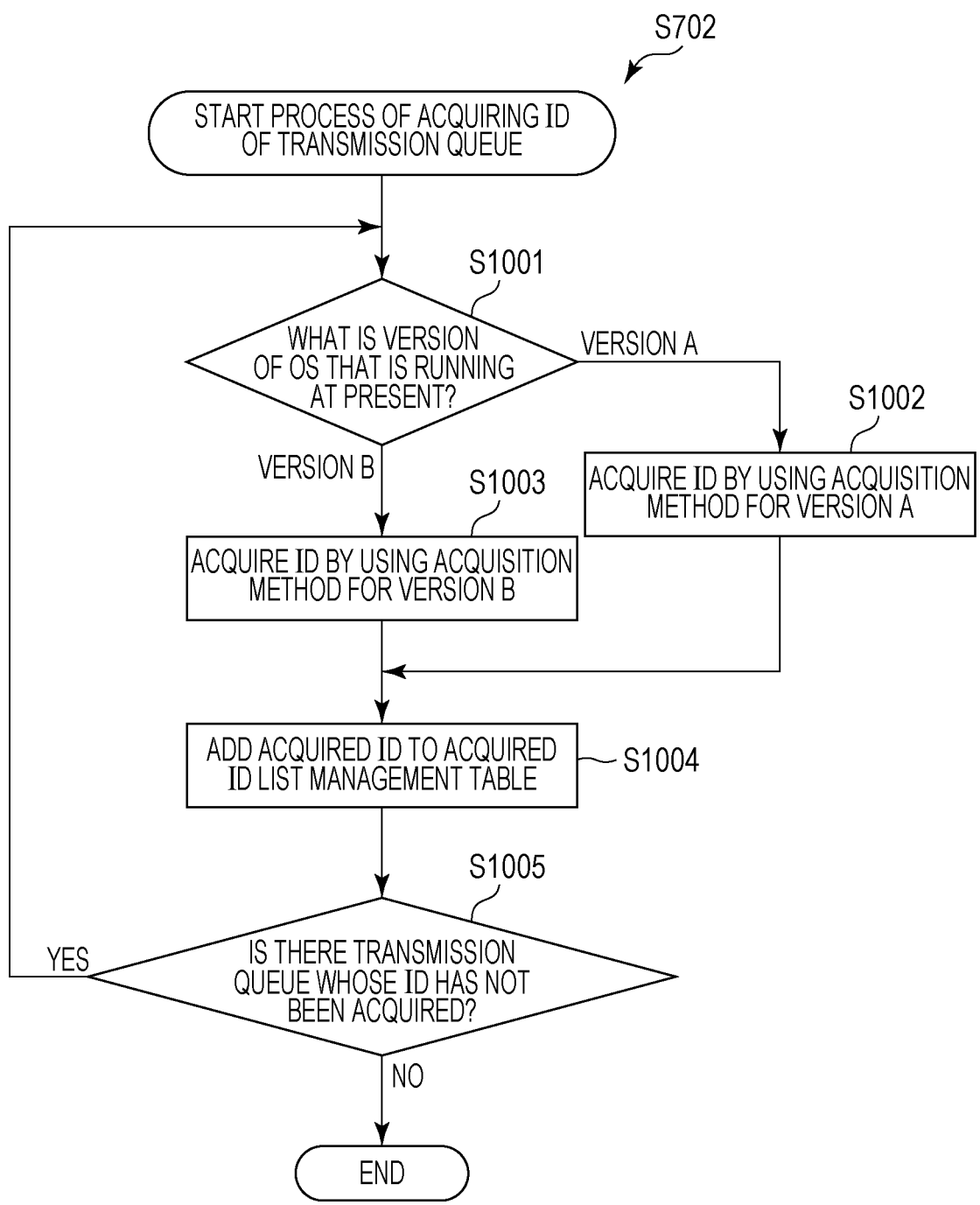
FIG. 10 is a flowchart concerning a process of acquiring an ID of a transmission queue according to one embodiment.

FIG. 10 is a flowchart for illustrating details of S702 in FIG. 7.

First, in S1001, the application 401 inquires about aversion of the OS that is running in the information processing apparatus 104 by using an application programming interface (API) of the OS. In accordance with a result obtained in S1001, the application 401 proceeds to S1002 in the case of a version A and to S1003 in the case of a version B. In the present embodiment, although the number of OS versions is two, the number of OS versions may be one or may be three or more. The reason why processes are separated according to an OS version is because the case is dealt with where an API with which the application 401 acquires an ID differs according to an OS. When S1002 is executed, the application 401 acquires an ID in accordance with a method of acquiring an ID of the transmission queue 403 supported by the version A of the OS. When S1003 is executed, the application 401 acquires an ID in accordance with a method of acquiring an ID of the transmission queue 403 supported by the version B of the OS.

In S1004, the application 401 writes the acquired ID into an acquired ID list management table 1101 managed by the application 401. If the ID is not able to be acquired, the application 401 writes the fact that the ID was not able to be acquired into the acquired ID list management table 1101. Subsequently, in S1005, the application 401 determines whether there is a transmission queue 403 whose ID has not been acquired. A determination method executed in S1005 will be described. The application 401 acquires all transmission queue names from the printing system 402. Through this process, pieces of information of transmission queue names illustrated in FIG. 11 are collected. Subsequently, the application 401 executes a process of acquiring an ID for a first transmission queue illustrated in FIG. 11. In this stage, the process of acquiring an ID has not been executed for second and subsequent transmission queues, and thus the application 401 makes a determination of YES in S1005. Then, when the process of acquiring an ID is completed for all transmission queues, the application 401 makes a determination of NO in S1005, and the process of FIG. 10 ends. Incidentally, FIG. 11 illustrates an example of the acquired ID list management table at a point in time when the process of FIG. 10 ends.

FIG. 12 is a flowchart for illustrating details of S703 in FIG. 7.

First, in S1201, the application 401 creates a new port setting $407_{M+1}$ with which communication with the printing device 101 targeted for repair determined in S803 is possible. Details of S1201 will be described later with reference to a flowchart of FIGS. 13A and 13B. When the port setting $407_{M+1}$ is created, in S1202, the application 401 sets setting information of the port setting $407_{M+1}$ in a port setting $407_1$ associated with a transmission queue $403_1$ targeted for repair determined in S808. Thus, a state of communication between the transmission queue $403_1$ and the printing device 101 targeted for repair is changed to a state in which the communication is possible, and print data can be transmitted to the printing device 101 targeted for repair via the transmission queue $403_1$. Incidentally, in S1201, regardless of a port typeset in the port setting $407_1$ of the transmission queue $403_1$, a WSD port and a host name port are created on a priority basis. Thus, even if an IP address of the printing device 101 targeted for repair is changed after repair, a state can be maintained as much as possible in which transmission of print data to the printing device 101 targeted for repair via the transmission queue $403_1$ is possible.

Figure 13A:
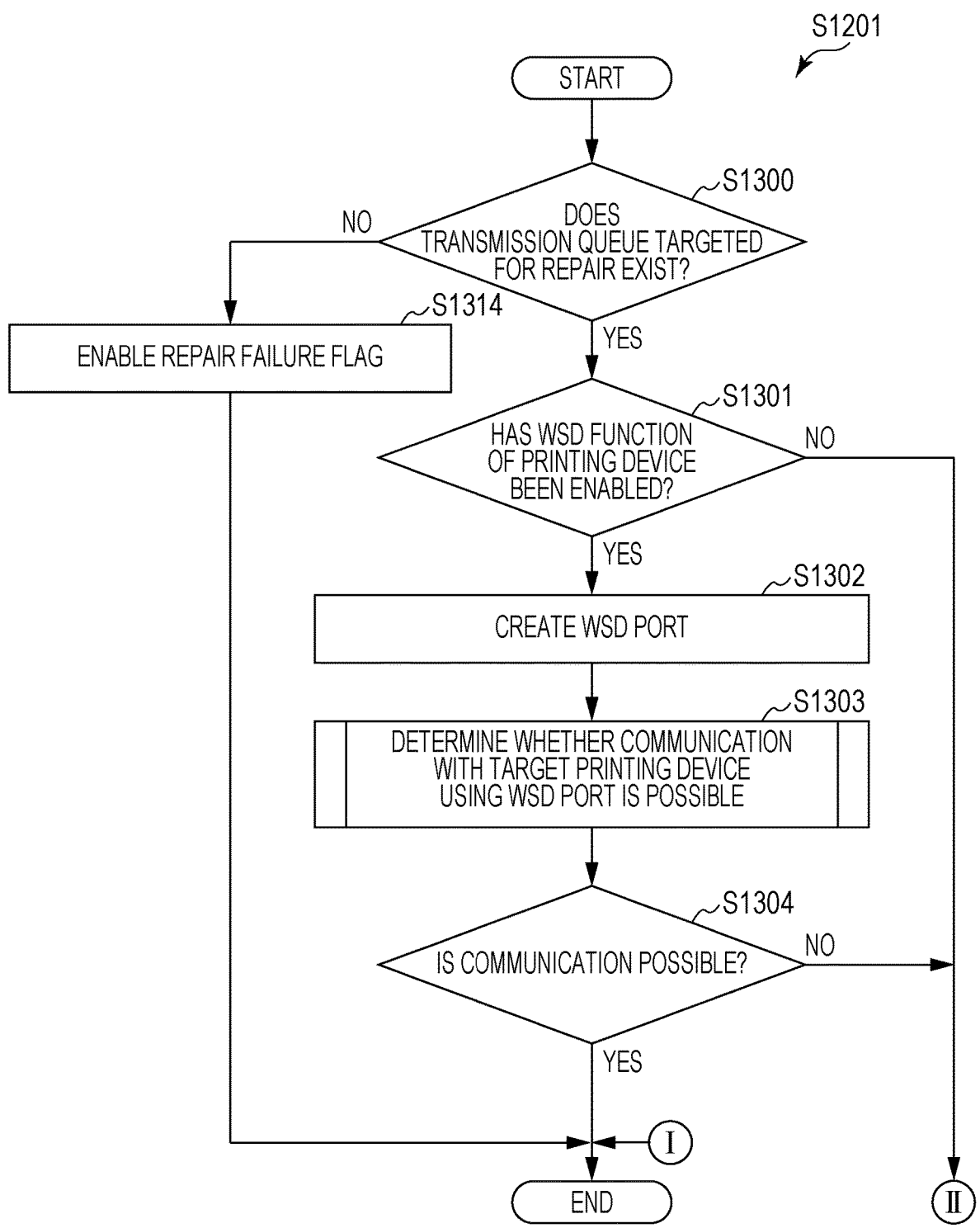
FIGS. 13A and 13B are a flowchart illustrating a flow of a port creation process according to one embodiment.
Figure 13B:
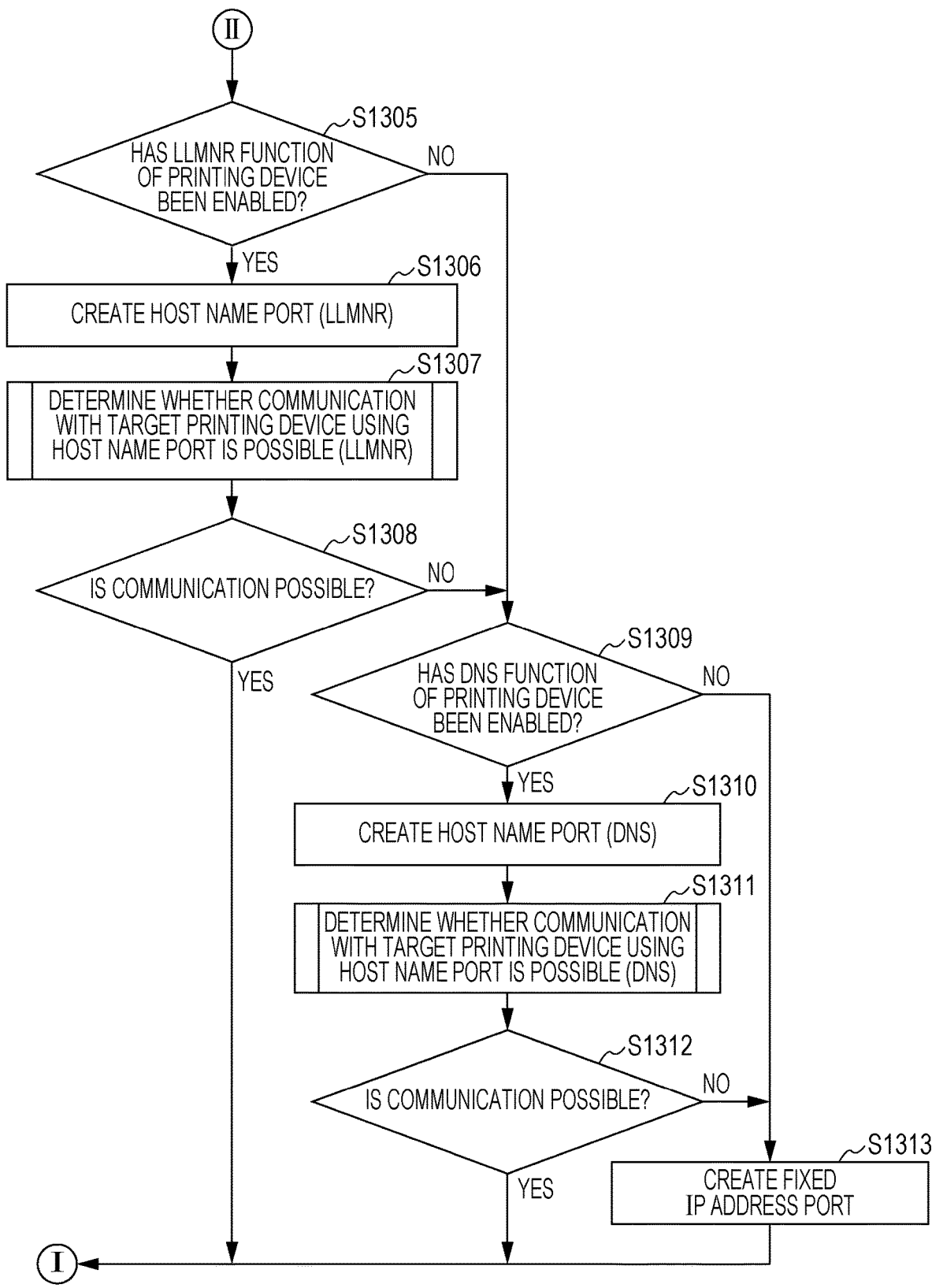

FIGS. 13A and 13B are a flowchart for illustrating details of S1201 in FIG. 12.

First, in S1300, the application 401 determines whether the transmission queue selected as a target for repair exists. When it is determined in S1300 that the transmission queue selected as a target for repair does not exist, the application 401 enables a repair failure flag in S1314 and ends the process of FIGS. 13A and 13B.

On the other hand, when it is determined in S1300 that the transmission queue selected as a target for repair exists, the application 401 determines in S1301 whether a WSD function of the printing device 101 targeted for repair selected in S803 has been enabled or disabled. Incidentally, S1301, S1305, and S1309 are each executed in accordance with network information included in a response to a search for a printing device made in a broadcast manner in S801.

When the WSD function of the printing device 101 has been enabled (YES in S1301), the application 401 creates a WSD port $407_{M+1}$ in S1302. Specifically, the application 401 searches for the printing device 101 using a WSD protocol and thereby creates a transmission queue and the WSD port $407_{M+1}$ of the printing device 101. Then, the application 401 executes a process of S1304 and subsequent processes by using the created WSD port $407_{M+1}$.

When the creation of the WSD port $407_{M+1}$ ends, the application 401 determines in S1303 whether communication with the printing device 101 using the WSD port $407_{M+1}$ is possible. Details of S1303 will be described later in FIG. 14.

When it is determined that communication with the printing device 101 using the WSD port $407_{M+1}$ is possible (YES in S1304), the process is ended.

On the other hand, when it is determined that communication with the printing device 101 using the WSD port $407_{M+1}$ is impossible (NO in S1304), or when the WSD function of the printing device 101 has been disabled (NO in S1301), the process of FIGS. 13A and 13B proceeds to S1305.

The application 401 determines whether an LLMNR function of the printing device 101 selected in S803 has been enabled or disabled (S1305). When the LLMNR function of the printing device 101 has been enabled (YES in S1305), the application 401 creates a host name port $407_{M+1}$ using an LLMNR name of the printing device 101 in S1306. Specifically, the application 401 describes, in a port type identifier, TCP/IP, RAW as a protocol, and a port number 9100. Then, the application 401 describes, in a network identifier, a host name acquired from the printing device 101. Incidentally, the host name is included in a response to a search made in a broadcast manner in S801. Through the above-described process, the host name port $407_{M+1}$ using the LLMNR name is created.

When the creation of the host name port $407_{M+1}$ ends, the application 401 determines in S1307 whether communication with the printing device 101 using the host name port $407_{M+1}$ is possible. Details of S1307 will be described later in FIG. 15. When it is determined that communication with the printing device 101 using the host name port $407_{M+1}$ is possible (YES in S1308), the process is ended.

On the other hand, when it is determined that communication with the printing device 101 using the host name port $407_{M+1}$ is impossible (NO in S1308), or when the LLMNR function of the printing device 101 has been disabled (NO in S1305), the process of FIGS. 13A and 13B proceeds to S1309. The application 401 determines whether a DNS function of the printing device 101 selected in S803 has been enabled or disabled (S1309). When the DNS function of the printing device 101 has been enabled (YES in S1309), the application 401 creates a host name port $407_{M+1}$ using a DNS name of the printing device 101 in S1310. Specifically, the application 401 describes, in a port type identifier, TCP/IP, RAW as a protocol, and a port number 9100. Furthermore, the application 401 describes, in a network identifier, a DNS host name and a DNS domain name acquired from the printing device 101. Incidentally, the DNS host name and the DNS domain name are included in a response to a search made in a broadcast manner in S801. Through the above-described process, the host name port $407_{M+1}$ using the DNS name is created.

When the creation of the host name port $407_{M+1}$ ends, the application 401 determines in S1311 whether communication with the printing device 101 using the host name port $407_{M+1}$ is possible. Details of S1311 will be described later in FIG. 15. When it is determined that communication with the printing device 101 using the host name port $407_{M+1}$ is possible (YES in S1312), the process is ended.

On the other hand, when it is determined that communication with the printing device 101 using the host name port $407_{M+1}$ is impossible (NO in S1312), or when the DNS function of the printing device 101 has been disabled (NO in S1309), the process of FIGS. 13A and 13B proceeds to S1313. The application 401 creates a fixed IP address port $407_{M+1}$ using an IP address of the printing device 101 (S1313). Specifically, the application 401 describes, in a port type identifier, TCP/IP, RAW as a protocol, and a port number 9100. Furthermore, the application 401 describes, in a network identifier, an IP address acquired from the printing device 101. Through the above-described process, the fixed IP address port $407_{M+1}$ is created.

In the process of FIGS. 13A and 13B, all processes do not have to be executed. For example, S1301 to S1304 may be executed.

In the present embodiment, although the example has been described in which WSD is used as a protocol that detects devices connected to the network, another protocol having a function similar to that of WSD may be used. Furthermore, in the present embodiment, although the example has been described in which LLMNR and DNS are used as a protocol having a name resolution function, another protocol having a name resolution function may be used. Furthermore, in the present embodiment, although the order of priority for the types of ports to be created is the order of a WSD port and a host name port, the order of priority is not limited to this order. Furthermore, the type of a port to be created may be only a WSD port or only a host name port. A port to be created at this time may be, for example, a port matching a port type of the port setting $407_1$ set in the transmission queue $403_1$.

Figure 14:
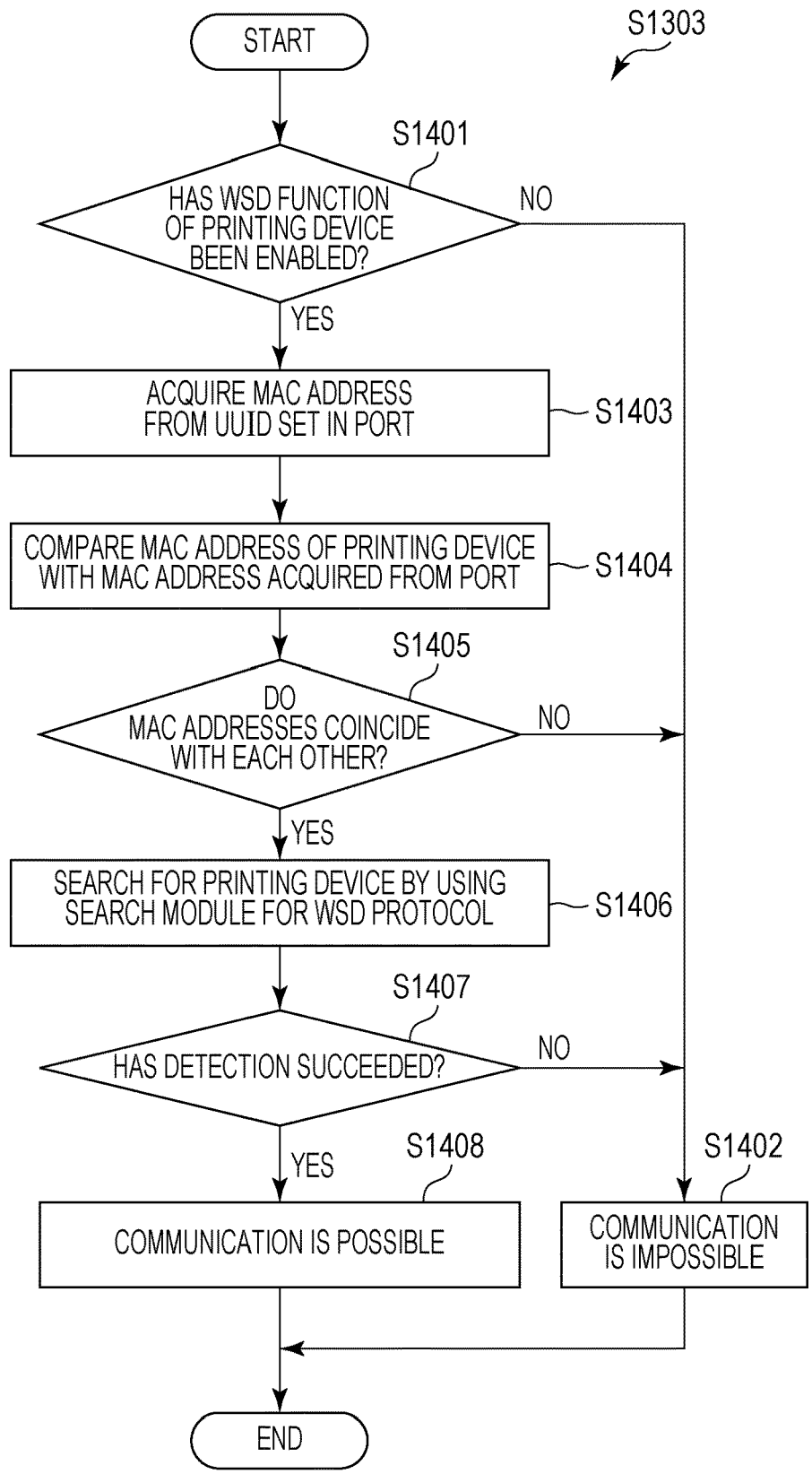
FIG. 14 is a flowchart concerning a determination as to whether communication using a port is possible according to one embodiment.

FIG. 14 is a flowchart for illustrating details of the process of S1303 in FIG. 13A. First, in S1401, the application 401 determines whether the WSD function of the printing device 101 selected in S803 has been enabled or disabled. When the WSD function of the printing device 101 has been disabled (NO in S1401), the application 401 determines in S1402 that communication with the printing device 101 using the WSD port $407_{M+1}$ is impossible. On the other hand, when the WSD function of the printing device 101 has been enabled (YES in S1401), the application 401 acquires a media access control (MAC) address from a universally unique identifier (UUID) set in a network identifier $409_{M+1}$ of the WSD port $407_{M+1}$ in S1403. Subsequently, in S1404, the application 401 compares a MAC address of the printing device 101 selected in S803 with the MAC address acquired in S1403. When these do not coincide with each other (NO in S1405), the application 401 determines in S1402 that communication with the printing device 101 using the WSD port $407_{M+1}$ is impossible.

On the other hand, when the MAC address of the printing device 101 coincides with the MAC address acquired in S1403 (YES in S1405), the application 401 executes S1406. The application 401 searches for the printing device 101 via unicast communication based on the UUID set in the network identifier $409_{M+1}$ by using a search module corresponding to the WSD protocol (S1406).

When the printing device 101 is not detected in S1406 (NO in S1407), the application 401 determines in S1402 that communication with the printing device 101 using the WSD port $407_{M+1}$ is impossible. On the other hand, when the printing device 101 is detected in S1406 (YES in S1407), the application 401 determines in S1408 that communication with the printing device 101 using the WSD port $407_{M+1}$ is possible. Incidentally, when the application 401 determines in S1401 whether the WSD function of the printing device 101 has been enabled or disabled, in comparison with the case where this determination is not made, a determination can be made early as to whether communication using the WSD port is possible in the case where the WSD function of the printing device 101 has been disabled. However, even in the case where this determination is not made, when the WSD function of the printing device 101 has been disabled, the printing device 101 is not detected in S1406, and it is determined in S1402 that communication with the printing device 101 using the WSD port $407_{M+1}$ is impossible. Hence, the result is the same.

Figure 15:
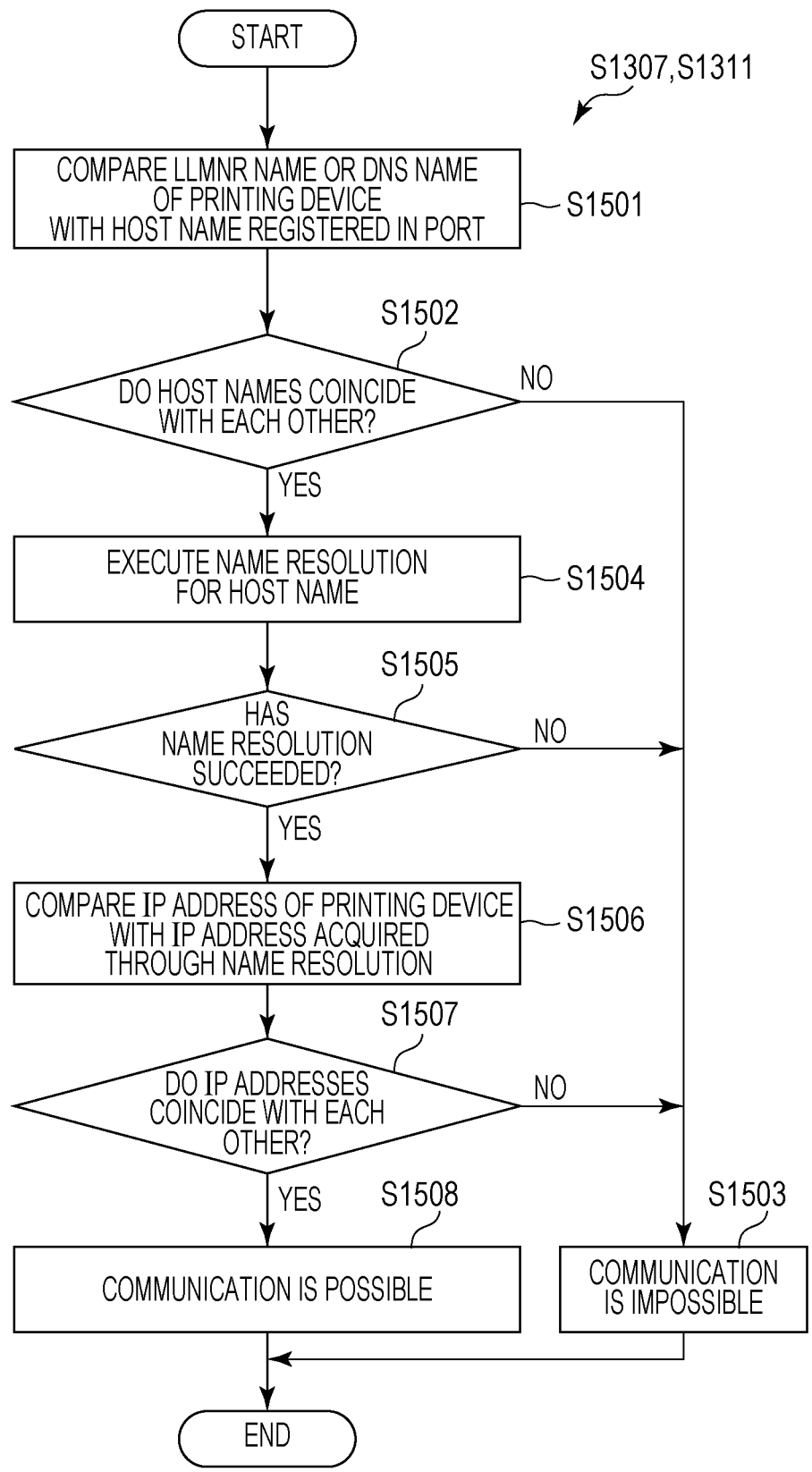
FIG. 15 is a flowchart concerning a determination as to whether communication using a port is possible according to one embodiment.

FIG. 15 is a flowchart for illustrating details of the process of each of S1307 and S1311 in FIG. 13B.

In S1501, the application 401 compares the LLMNR name or DNS name of the printing device 101 selected in S803 with the host name set in the network identifier $409_{M+1}$ of the host name port $407_{M+1}$. The case where the LLMNR name is used is the case where S1307 is executed. On the other hand, the case where the DNS name is used is the case where S311 is executed. When these do not coincide with each other (NO in S1502), the application 401 determines in S1503 that communication with the printing device 101 using the host name port $407_{M+1}$ is impossible. On the other hand, when the LLMNR name or DNS name of the printing device 101 coincides with the host name set in the network identifier $409_{M+1}$ of the host name port $407_{M+1}$ (YES in S1502), the process of FIG. 15 proceeds to S1504. Subsequently, the application 401 executes name resolution for the host name set in the network identifier $409_{M+1}$ of the host name port $407_{M+1}$. For example, the application 401 specifies the host name set in the network identifier $409_{M+1}$ and transmits an inquiry command for inquiring about an IP address in a broadcast manner via the network. As a result, the printing device 101 corresponding to the host name transmits an IP address as a response command. When transmission of the inquiry command and reception of the response command are appropriately performed, name resolution succeeds, and the application 401 can acquire the IP address of the printing device 101.

When name resolution fails (NO in S1505), the application 401 determines in S1503 that communication with the printing device 101 using the host name port $407_{M+1}$ is impossible. On the other hand, when name resolution succeeds (YES in S1505), S1506 is executed. The application 401 compares the IP address of the printing device 101 selected in S803 with the IP address acquired in S1504 (S1506). Incidentally, as described above, S1504 is a process in which the application 401 acquires an IP address by executing name resolution for the host name set in the network identifier $409_{M+1}$ of the host name port $407_{M+1}$.

When these coincide with each other (YES in S1507), the application 401 determines in S1508 that communication with the printing device 101 using the host name port $407_{M+1}$ is possible. On the other hand, when the IP address of the printing device 101 does not coincide with the IP address of the host name port $407_{M+1}$ (NO in S1507), the application 401 determines in S1503 that communication with the printing device 101 using the host name port $407_{M+1}$ is impossible.

Here, an example will be described. For example, assume that the user selects 8500 series (GDI WSD) in FIG. 9C. As is evident from FIG. 11, an ID of the 8500 series (GDI WSD) is " . . . 0000-1000-8000-ABCD1234EFGH". Furthermore, the same ID is set in 8500 series (XPS WSD) and 8500 series (FAX WSD). Thus, the application 401 executes the repair process (S703) for the 8500 series (GDI WSD) that is the transmission queue determined in S701. Subsequently, the application 401 makes a determination of YES in S704 and executes the repair process (S703) for the 8500 series (XPS WSD) that is a next transmission queue. Subsequently, the application 401 makes a determination of YES in S704 and executes the repair process (S703) for the 8500 series (FAX WSD) that is a next transmission queue. Subsequently, the application 401 makes a determination of NO in S704 and ends the repair process. That is, when the user just selects one transmission queue, other related transmission queues are repaired, therefore increasing user convenience. Incidentally, in S703 executed for the second and subsequent transmission queues (that is, the transmission queues automatically selected by the application 401), the port created for the transmission queue targeted for repair selected by the user may be directly set in the second and subsequent transmission queues. In other words, only S1202 may be executed for the second and subsequent transmission queues. On the other hand, in S703 executed for the second and subsequent transmission queues (that is, the transmission queues automatically selected by the application 401), the same process as the process executed for the transmission queue targeted for repair selected by the user may be repeatedly executed. In other words, S1201 (that is, FIGS. 13A and 13B) and S1202 may be executed for the second and subsequent transmission queues.

Figure 16A:
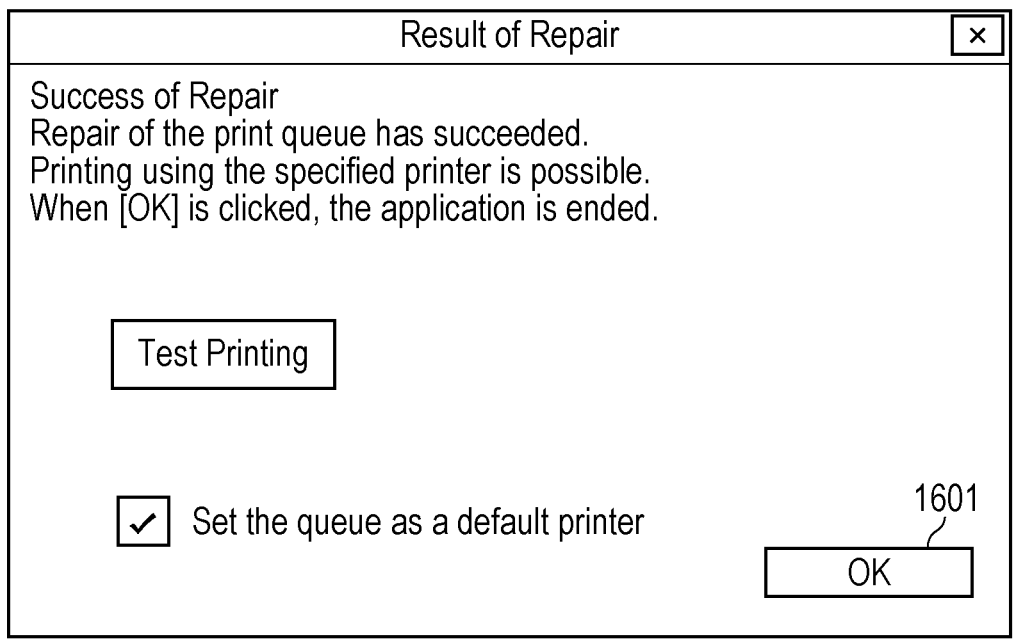
FIGS. 16A and 16B each illustrate an example of a UI screen of the application according to one embodiment.
Figure 16B:
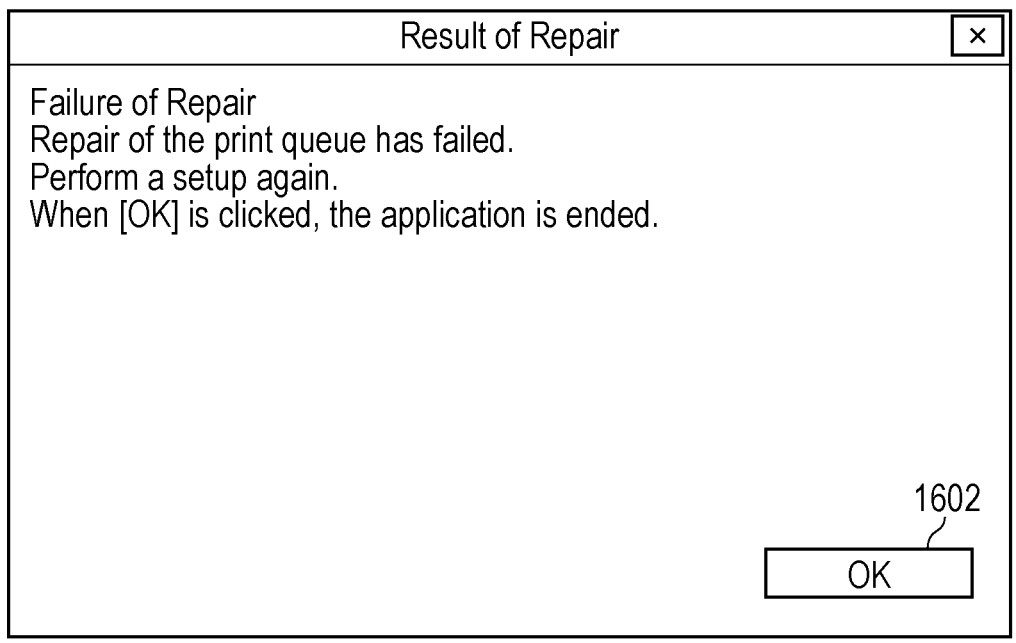

When the process of FIG. 7 ends, the application 401 displays, as results of repair, screens illustrated in FIGS. 16A and 16B. When the repair failure flag has been enabled in FIG. 13A, the application 401 displays the screen illustrated in FIG. 16B. On the other hand, when the repair failure flag has not been enabled, the application 401 displays the screen illustrated in FIG. 16A.

The screen illustrated in FIG. 16A is displayed when the repair process succeeds, and the screen illustrated in FIG. 16B is displayed when the repair process fails. FIG. 16A illustrates that the transmission queue selected by the user has been repaired and that printing using the printing device 101 is possible, and an [OK] button 1601 is displayed. When a press of the [OK] button 1601 is detected, the application 401 ends the program. In the screen illustrated in FIG. 16A, a checkbox is included that receives specification as to whether to set the queue as a default printer. For example, in the case where the transmission queue targeted for repair has not been specified as a default printer, the screen illustrated in FIG. 16A is displayed in which the checkbox has been checked by default. On the other hand, in the case where the transmission queue targeted for repair has already been specified as a default printer, the checkbox and a message "Set the queue as a default printer" may be hidden from view. When the [OK] button 1601 is pressed with the screen illustrated in FIG. 16A displayed, the transmission queue targeted for repair is managed as a default printer in the OS. The print queue managed as a default printer is selected as a default when an instruction to perform printing is provided in an application (a document creation application or a spreadsheet application) that provides an instruction to perform printing. Furthermore, when test printing is pressed, print data based on data for test printing held by the application 401 is transmitted to the printing device 101 via the transmission queue targeted for repair. Incidentally, in the present embodiment, although other queues in which the same ID as that of the transmission queue selected by the user is set are also repaired, test printing via those other queues is not performed.

FIG. 16B illustrates that repair of the transmission queue selected by the user has failed, and an [OK] button 1602 is displayed. When a press of the [OK] button 1602 is detected, the application 401 ends the program.

As described above, in the present embodiment, S703 is executed until a determination of NO is made in S704. As a result, all queues related to the transmission queue targeted for repair selected by the user can be repaired. In other words, for example, even if there are two other transmission queues with the same ID as that of the transmission queue selected by the user as described above, the user does not have to select the transmission queues one by one, thereby making it possible to reduce load on operation.

In the above-described embodiment, although a description has been provided in which an ID of a transmission queue 403 is assigned by the OS and is a Container ID in the Windows OS, the embodiment is not limited to this. For example, an ID of a transmission queue 403 may be assigned by a setup program. A point in time when the setup program assigns an ID is a point in time when an instruction to create a transmission queue 403 is provided to the OS. The setup program is software having a function of installing a printer driver. Furthermore, conceivable examples of the ID include the model name, serial number, MAC address, and IP address of a printing device.

In the above-described embodiment, although the application 401 determines in S704 whether there is another transmission queue with the same ID, the application 401 may determine whether there is another FAX queue with the same ID. In other words, the application 401 automatically selects a transmission queue for FAX from among other transmission queues with which the same identification information as that of the transmission queue selected by the user is associated and may execute the port repair process for the transmission queue for FAX. Thus, for example, if the user selects a transmission queue of 8500 series (GDI WSD) in FIG. 9, the same ID as that of the selected transmission queue is set in 8500 series (XPS WSD) and 8500 series (FAX WSD). However, the application 401 may execute the repair process only for the 8500 series (GDI WSD) selected by the user and the 8500 series (FAX WSD).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-138246, filed Jul. 26, 2019, which is hereby incorporated by reference herein in its entirety.

What is claimed is:

1. An information processing apparatus having a plurality of transmission queues, the information processing apparatus comprising:
 one or more processors; and
 one or more memories storing instructions that, when executed by the one or more processors, cause the information processing apparatus to:
 determine a target transmission queue from among the plurality of transmission queues;
 perform first change processing to change first port setting information which corresponds to the determined target transmission queue and with which communication with a printing device corresponding to the target transmission queue is not possible, to second port setting information, different from the first port setting information, with which communication with the printing device corresponding to the target transmission queue is possible; and
 perform second change processing to change port setting information of a plurality of transmission queues, different from the target transmission queue, with which same identification information as identification information of the target transmission queue is associated, to the second port setting information with which communication with the printing device is possible.

2. The information processing apparatus according to claim 1, wherein the identification information of the target transmission queue is a Container ID set by an operating system.

3. The information processing apparatus according to claim 1, wherein, at a point in time when the target transmission queue is created, the identification information of the target transmission queue is set by a setup program that performs installation of a printer driver.

4. The information processing apparatus according to claim 1, wherein, after the second port setting information, with which communication with the printing device is possible, is set in the target transmission queue and in the plurality of transmission queues with which the same identification information as the identification information of the target transmission queue is associated, print data for test printing is transmitted to the printing device by using the target transmission queue, and the print data for the test printing is not transmitted to the printing device by using the plurality of transmission queues.

5. The information processing apparatus according to claim 1,
 wherein, when executed by the one or more processors, the information processing apparatus is further caused to:
 create new port setting information corresponding to the target transmission queue; and
 determine whether communication with the printing device corresponding to the target transmission queue using the new port setting information is possible,
 wherein, when it is determined that communication with the printing device corresponding to the target transmission queue using the new port setting information is possible, the created new port setting information is set in the target transmission queue.

6. The information processing apparatus according to claim 1, wherein the information processing apparatus is caused to change, from among the plurality of transmission queues with which the same identification information as the identification information of the target transmission queue is associated, port setting information of a transmission queue for FAX, to the second port setting information with which communication with the printing device is possible.

7. The information processing apparatus according to claim 1, wherein, when executed by the one or more processors, the information processing apparatus is further caused to display a test printing screen for accepting an instruction of accepting an instruction of test printing, in a case where the first change processing and the second change processing are performed.

8. A control method comprising:
 determining a target transmission queue from among a plurality of transmission queues; and
 performing first change processing to change first port setting information which corresponds to the determined target transmission queue and with which communication with a printing device corresponding to the target transmission queue is not possible, to second port setting information, different from the first port setting information, with which communication with the printing device corresponding to the target transmission queue is possible; and
 performing second change processing to change port setting information of a plurality of transmission queues, different from the target transmission queue, with which same identification information as identification information of the target transmission queue is associated is changed, to the second port setting information with which communication with the printing device is possible.

9. The control method according to claim 8, wherein the identification information of the target transmission queue is a Container ID set by an operating system.

10. The control method according to claim 8, wherein, at a point in time when the transmission queue is created, the identification information of the target transmission queue is set by a setup program that performs installation of a printer driver.

11. The control method according to claim 8, wherein, after the second port setting information, with which communication with the printing device is possible, is set in the target transmission queue and in the plurality of transmission queues with which the same identification information as the identification information of the target transmission queue is associated, print data for test printing is transmitted to the printing device by using the target transmission queue, and the print data for the test printing is not transmitted to the printing device by using the plurality of transmission queues.

12. The control method according to claim 8, further comprising:
 creating new port setting information corresponding to the target transmission queue; and
 determining whether communication with the printing device corresponding to the target transmission queue using the created new port setting information is possible, wherein, when it is determined that communication with the printing device corresponding to the target transmission queue using the created new port setting information is possible, in the changing, the created new port setting information is set in the target transmission queue.

13. The control method according to claim 8, wherein, in the changing, from among the plurality of transmission queues with which the same identification information as the identification information of the target transmission queue is associated, port setting information of a transmission queue for FAX is changed, to the second port setting information with which communication with the printing device is possible.

14. The control method according to claim 8, further comprising displaying a test printing screen for accepting an instruction of accepting an instruction of test printing, in a case where the first change processing and the second change processing are performed.

15. A non-transitory computer-readable storage medium storing a program for causing a computer to function to execute operations comprising:
   determining a target transmission queue from among a plurality of transmission queues;
   performing first change processing to change first port setting information which corresponds to the determined target transmission queue and with which communication with a printing device corresponding to the target transmission queue is not possible, to second port setting information, different from the first port setting information, with which communication with the printing device corresponding to the target transmission queue is possible; and
   performing second change processing to change port setting information of a plurality of transmission queues, different from the target transmission queue, with which same identification information as identification information of the target transmission queue is associated is changed, to the second port setting information with which communication with the printing device is possible.

16. The non-transitory computer-readable storage medium according to claim 15, wherein the identification information of the target transmission queue is a Container ID set by an operating system.

17. The non-transitory computer-readable storage medium according to claim 15, wherein, at a point in time when the target transmission queue is created, the identification information of the target transmission queue is set by a setup program that performs installation of a printer driver.

18. The non-transitory computer-readable storage medium according to claim 15, wherein, after the second port setting information, with which communication with the printing device is possible, is set in the target transmission queue and in the plurality of transmission queues with which the same identification information as the identification information of the target transmission queue is associated, print data for the test printing is transmitted to the printing device by using the target transmission queue, and the print data for the test printing is not transmitted to the printing device by using the plurality of transmission queues.

19. The non-transitory computer-readable storage medium according to claim 13, wherein the operation further comprises:
   creating new port setting information corresponding to the target transmission queue; and
   determining whether communication with the printing device corresponding to the target transmission queue using the created new port setting information is possible, and
   wherein, when it is determined that communication with the printing device corresponding to the target transmission queue using the created new port setting information is possible, in the changing, the created new port setting information is set in the target transmission queue.

20. The non-transitory computer-readable storage medium according to claim 15, wherein, in the changing, from among the plurality of transmission queues with which the same identification information as the identification information of the target transmission queue is associated, port setting information of a transmission queue for FAX is changed, to the second port setting information with which communication with the printing device is possible.

21. The non-transitory computer-readable storage medium according to claim 15, wherein the operations further comprise displaying a test printing screen for accepting an instruction of accepting an instruction of test printing, in a case where the first change processing and the second change processing are performed.

* * * * *